Patented Apr. 9, 1940

2,196,384

UNITED STATES PATENT OFFICE 2,196,384

PHENYL MERCURIC BORATE

Walter G. Christiansen, Glen Ridge, N. J., assignor, by mesne assignments, to Lever Brothers Company, a corporation of Maine No Drawing. Application August 7, 1937, Serial No. 157,999

1 Claim. (Cl. 260—433)

This invention relates to, and has for its object the provision of, a phenylmercuric borate and method of preparing the same.

Arylmercuric borates may be prepared by various methods, as by causing arylmercuric hydroxides and boric acid to interact. Manifestly, a plurality of arylmercuric borates are possible, since (ortho) boric acid is a tribasic acid and is furthermore convertible into metaboric acid by heating. Aqueous solutions of these salts, especially the phenylmercuric, constitute valuable bactericidal compositions, which are stable on aging (i. e. do not deposit sediment during long periods of storage at room temperature), and the activity of which is little affected by the presence of organic matter. Other solutions of these salts, as also dry and plastic preparations thereof, among them powders and salves, have similar therapeutic utility.

Example 1

By evaporating to dryness in vacuo a mixture of alcoholic solutions containing, respectively, 29.4 parts of phenylmercuric hydroxide and 6.2 parts of boric acid, a phenylmercuric borate may be obtained as a white microcrystalline powder melting at 112–113° C., slightly soluble (but considerably more soluble than many other phenylmercuric compounds) in water, slightly soluble in alcohol, and containing about 60% of mercury, none of which is ionizable.

Example 2

An intimate mixture of equivalent amounts of phenylmercuric hydroxide and boric acid is heated at 110° C. in a vacuum chamber until an equivalent of water is liberated, the chamber being equipped with a small container of phosphorus pentoxide to absorb the water; a phenylmercuric borate remains as a white microcrystalline powder melting at 186.5–192° C.

Example 3

To obtain directly an aqueous solution of a phenylmercuric borate, 2.6 g. of boric acid and 5.2 g. of glycerin may be added to an aqueous solution of 5.2 g. of phenylmercuric hydroxide in 500 cc. of water; and the solution is filtered and, on the basis of a mercury assay, diluted to 510 cc. to give a 1.1% concentration of the phenylmercuric borate. On long standing, this solution gives a small quantity of white crystals, in radiate clusters of stout prisms, melting at 126° C. with effervescence.

It is to be understood that the foregoing examples are merely illustrative and by no means limitative of the invention, which may be variously otherwise embodied within the scope of the appended claim.

I claim:

A phenylmercuric borate melting at 112–113° C., and obtainable by evaporating to dryness in vacuo an alcoholic solution containing equimolar proportions of phenylmercuric hydroxide and boric acid.

WALTER G. CHRISTIANSEN.